US008079549B2

(12) United States Patent
Gouvea

(10) Patent No.: US 8,079,549 B2
(45) Date of Patent: Dec. 20, 2011

(54) MONOLITHIC INTEGRATED STRUCTURAL PANELS ESPECIALLY USEFUL FOR AIRCRAFT STRUCTURES

(75) Inventor: Roberto Paton Gouvea, São José dos Campos (BR)

(73) Assignee: Embraer—Empresa Brasileira De Aeronautica S.A., Sao Jose Dos Campos—SP (BR)

( * ) Notice: Subject to any disclaimer, the term of this patent is extended or adjusted under 35 U.S.C. 154(b) by 124 days.

(21) Appl. No.: 12/165,213

(22) Filed: Jun. 30, 2008

(65) Prior Publication Data
US 2009/0320398 A1 Dec. 31, 2009

(51) Int. Cl.
*B64C 1/00* (2006.01)
*B64C 1/06* (2006.01)

(52) U.S. Cl. ........... 244/119; 52/348; 52/838; 52/404.4; 428/105; 428/114; 244/120

(58) Field of Classification Search ................ 52/407.1, 52/407.3, 404.4, 634, 638, 838, 839, 841, 52/842, 267, 270, 348–350, 415, 424, 429, 52/431, 434, 474, 479, 762, 483.1, 764, 506.03, 52/782.1, 407.4; 428/116, 105, 113, 114, 428/172; 156/182, 256, 257; 244/124, 123, 244/119, 120, 131
See application file for complete search history.

(56) References Cited

U.S. PATENT DOCUMENTS

| 4,310,132 | A |   | 1/1982 | Frosch et al. |
| 4,671,470 | A | * | 6/1987 | Jonas ............................ 244/119 |
| 4,916,027 | A | * | 4/1990 | DelMundo .................... 428/586 |
| 5,242,523 | A |   | 9/1993 | Willden et al. |
| 5,252,220 | A | * | 10/1993 | Coughlin et al. ............. 210/644 |
| 5,262,220 | A | * | 11/1993 | Spriggs et al. ................ 428/156 |
| 5,366,787 | A | * | 11/1994 | Yasui et al. .................... 428/174 |
| 5,451,377 | A | * | 9/1995 | Asher et al. ................... 428/167 |
| 5,806,792 | A | * | 9/1998 | Brossier et al. ................. 244/54 |
| 5,932,358 | A | * | 8/1999 | Holz .............................. 428/594 |
| 6,055,788 | A | * | 5/2000 | Martin et al. ................. 296/204 |
| 6,511,570 | B2 | * | 1/2003 | Matsui .......................... 156/245 |
| 6,730,184 | B2 | * | 5/2004 | Kondo et al. ................. 156/221 |
| 7,134,629 | B2 |   | 11/2006 | Johnson et al. |
| 7,527,222 | B2 | * | 5/2009 | Biornstad et al. ............ 244/120 |
| 7,571,828 | B2 | * | 8/2009 | Palley et al. .................. 220/1.5 |
| 7,845,594 | B2 | * | 12/2010 | Poggi ........................ 244/117 R |
| 7,871,040 | B2 | * | 1/2011 | Lee et al. ...................... 244/119 |
| 7,963,477 | B2 | * | 6/2011 | Soula et al. ................... 244/1 A |

* cited by examiner

*Primary Examiner* — Jeanette E. Chapman
(74) *Attorney, Agent, or Firm* — Nixon & Vanderhye P.C.

(57) ABSTRACT

Structural panels for use in manufacturing fuselage bodies and other aircraft structures are disclosed herein. In one embodiment, a monolithic integrated structural panel is configured to include a skin, an array of stiffeners and an array of frames which are preferably arranged in a mutually orthogonal layout, without the need of cut-outs in any of the crossing elements. One advantage of the disclosed embodiments is that the frame and stringer members have continuous flanges and spliced webs. The disclosed embodiments herein are compatible with composite materials technology, offering another advantage, namely the possibility of manufacturing integrated products in a single cure ("one-shot") cycle. A structure of composite materials, e.g. carbon fiber reinforced plastics, typically comprises a skin panel, reinforced by frame and stringer members. A monolithic integrated structure constructed in accordance with the disclosed embodiments is well-suited for use as a portion of an aircraft structure, for example an aircraft fuselage, wing or empennage.

11 Claims, 6 Drawing Sheets

MONOLITHIC INTEGRATED STRUCTURAL PANELS ESPECIALLY USEFUL FOR AIRCRAFT STRUCTURES

FIELD OF THE INVENTION

The following disclosure relates generally to a monolithic integrated structures and, more particularly, to structures for use in aircrafts and other vehicles.

BACKGROUND AND SUMMARY OF THE INVENTION

Aircraft manufacturers continuously attempt to improve aircraft performance by reducing both weight and manufacturing costs while maintaining or improving structural strength. One well-known method for increasing aircraft performance is to reduce airframe weight through the use of state-of-the-art materials, such as composites, having relatively high strength-to-weight and stiffness-to-weight ratios. Composite materials are generally described as being materials that include reinforcing fibers, such as graphite fibers, embedded in a polymeric matrix, such as an epoxy resin. Such materials will hereinafter be referenced as "fiber-reinforced composite" materials.

A variety of composite designs are being proposed on an on-going basis by a number of aircraft manufacturers.

U.S. Pat. No. 4,310,132 discloses a built-up fuselage formed by skins in composite materials stiffened by integral stringers shaped with "J" section, crossed by metallic frames. The frames are cut in order to permit the passage of uninterrupted stringers through cut-outs. The stringers are attached to the frames using clips and mechanical fasteners.

U.S. Pat. No. 5,242,523 discloses a bonded fuselage, totally made of composite materials, with skins and stringers shaped with an "omega" cross-section, crossing the frames through cut-outs, wherein each stringer has pressure bridges provided by additional parts.

U.S. Pat. No. 7,134,629 discloses a built-up fuselage, totally made of composite materials, formed by integral skins stiffened by stringers shaped with an "omega" cross-section crossing the frames through cut-outs.

Considerable disadvantages exist however in the known prior art, which requires the installation of the stringers and frames. Manufacturing stringers with different geometries is very expensive. Another disadvantage is that some stringer installation by riveting is time-consuming and cost-demanding. Such a method creates a great number of holes through the outer skin, which always increases the potential for corrosion and fatigue problems. Another concern is the intersection where the stringer passes the frames. Specifically, according to the current state of the art, each of the frames can include a base portion and an upstanding portion projecting away from the base portion wherein the upstanding portion can include a plurality of openings (colloquially known as "mouse houses") through which the continuous stringer passes. Several problems can rise from the cut-outs, such as stress concentration, leading to small cracks which may grow in a straight line and extend through the complete section, spoiling the strength of the frame.

As conventional methods for manufacturing airframes in composite materials often require expensive tooling and labor-intensive assembly procedures it would therefore be highly desirable to develop new panel structures with reduced weight and increased cost efficiency in the manufacturing process. It is towards fulfilling such needs that the present invention is directed.

The present invention is therefore directed generally toward structural panels for use in manufacturing aircraft and other structures. The present invention relates generally to a monolithic integrated structure including a skin, a stiffener and a frame without cut-outs and a method of manufacturing the said structure.

According to some embodiments, a monolithic structural panel formed entirely of a fiber-reinforced composite material will comprise a skin, and frame and stinger members attached to the skin, wherein intersections between the frame and stringer members include cross-plied laminae of fiber-reinforced composite material. In some embodiments, the frame and stringer members are substantially mutually orthogonal to one another. The intersections between respective frame and stringer members comprise preformed modular units, wherein the modular units are structurally united to one another by lengthwise flanges formed of laminae of fiber-reinforced composite material. Bridge elements (preferably generally V-shaped) may be provided at the intersections between the frame and stringer members, the bridge elements are joined to the stringer members by means of the lengthwise flanges.

A one-piece structural panel for aircraft according to other embodiments of the invention may comprise mutually orthogonal frame and stringer members intersecting at a monolithic junction and formed entirely from a fiber-reinforced composite material.

In other embodiments, methods of making a structural panel are provided which include joining frame and stringer members to a skin, wherein each of the skin and frame and stringer members is formed of a fiber-reinforced composite material, and wherein intersections between the frame and stringer members are formed by cross-plying laminae of fiber-reinforced composite material. In some preferred embodiments, the frame and stringer members are mutually orthogonal to one another.

In certain embodiments, methods are provided to fabricate an aircraft structural panel by providing a preform of mutually orthogonal frame and stringer members formed of a fiber-reinforced composite material and having a monolithic junction therebetween, positioning the preform on a skin formed of a fiber-reinforced composite material, and thereafter co-curing the preform and the skin to form an aircraft structural panel.

These and other aspects and advantages will become more apparent after careful consideration is given to the following detailed description of the preferred exemplary embodiments thereof.

BRIEF DESCRIPTION OF THE ACCOMPANYING DRAWINGS

Reference will hereinafter be made to the accompanying drawings, wherein like reference numerals throughout the various FIGURES denote like structural elements, and wherein.

DETAILED DESCRIPTION OF THE INVENTION

The following disclosure describes monolithic integrated structure panel with bi-directional reinforcements having a I-shaped cross-sectional profile for use in manufacturing aircraft and other structures. Certain details are set forth in the following description and in the accompanying drawing FIGURES to provide a thorough understanding of various embodiments of the invention. It is important to note however that there are virtually no restrictions to the element profile and thus, in addition to the I-shaped cross-sectional profile exemplified, other cross-sectional profiles having C, Z, Ω and the like are possible. Other details describing well-known structures and systems often associated with aircraft structures and composite materials are not set forth in the following disclosure to avoid unnecessarily obscuring the description of the various embodiments of the invention.

Many of the details, dimensions, angles, and other features shown in the accompanying drawing FIGURES are merely illustrative of particular embodiments of the invention and obey engineering requirements and manufacturing characteristics particular to each design and application. Accordingly, other embodiments can have other details, dimensions, angles, and features without departing from the spirit or scope of the present invention. In addition, further embodiments can be practiced without several of the details described below.

By the term "monolithic" is meant that the various structural components are integrated into a one-piece unit without readily discernible seams and without openings to accommodate intersecting structures. This is accomplished by means of the present invention by laminating plies of composite material one to another so as to structurally join by lamination preformed modular elements and/or to fabricate in situ the various components described herein (e.g., as described by U.S. Pat. No. 6,972,068, the entire content of which is expressly incorporated hereinto by reference).

Figure 1:
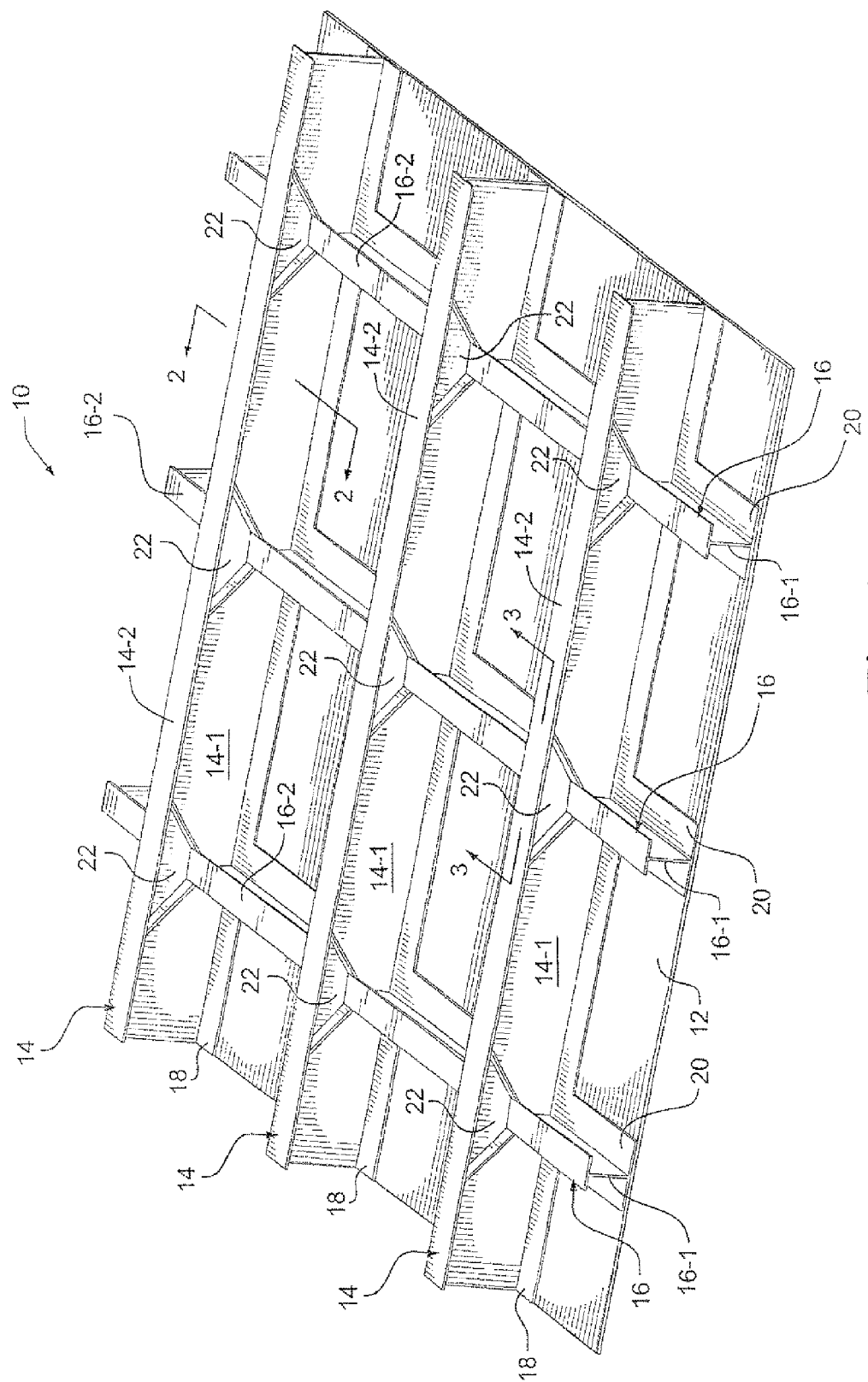
FIG. 1 is a perspective view of one embodiment of a monolithic structural panel in accordance with the present invention.
Figure 2:
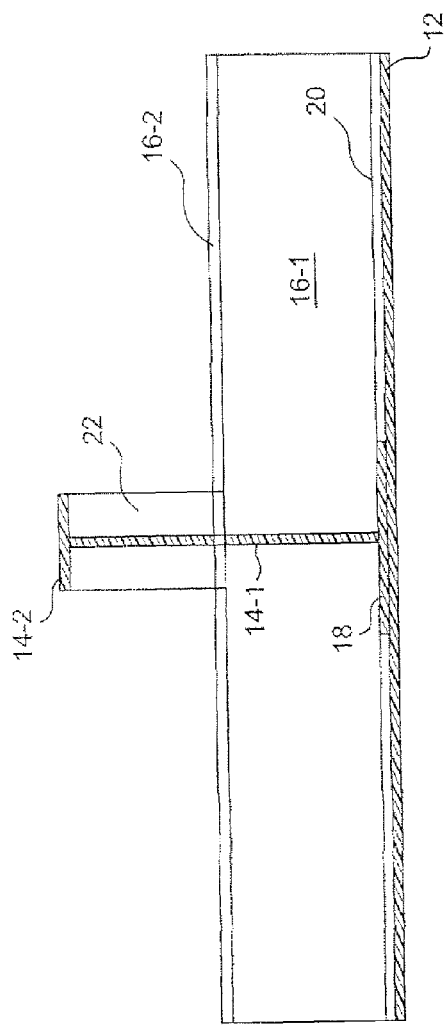
FIG. 2 is an enlarged cross-sectional elevational view of the monolithic structural panel depicted in FIG. 1 taken along line 2-2 therein.
Figure 3:
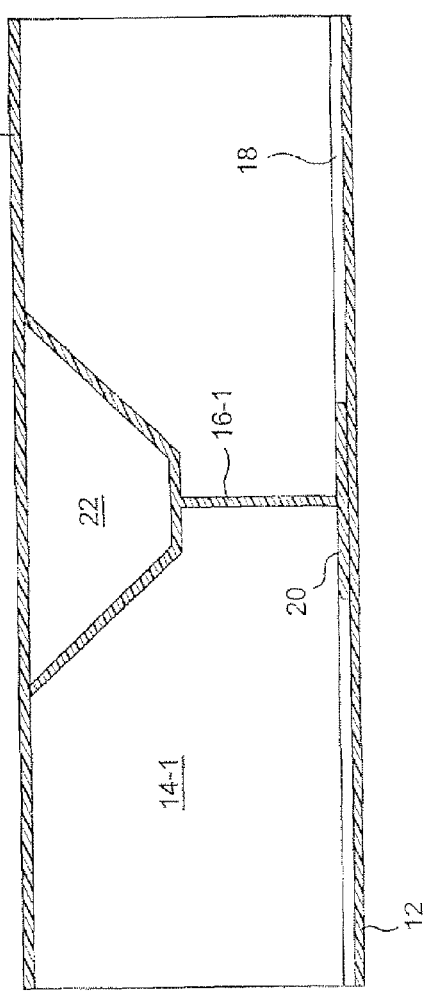
FIG. 3 is an enlarged cross-sectional elevational view of the monolithic structural panel depicted in FIG. 1 taken along line 3-3 therein.

An exemplary monolithic structural panel 10 according to one embodiment of the present invention is depicted in accompanying FIGS. 1-3 as including a skin 12 which is structurally reinforced by substantially mutually orthogonal frame and stringer members 14, 16, respectively. Reinforcement members 18, 20 form a reinforcement base adjacent the skin 12 for each of the frame and stringer members 14, 16, respectively.

The frame and stringer members 14, 16 are each depicted as having a generally I-shaped cross-sectional profile. As noted previously, however, virtually any desired cross-sectional profile may be provided, Thus, in the exemplary embodiment depicted, the frame and stringer members 14, 16 will have a web 14-1, 16-1 joining the reinforcement members 18, 20 and the upper flange caps 14-2, 16-2.

The frames 14 are provided with generally V-shaped bridge elements 22 which assist in monolithically joining the stringer members 16 to the frame members 14 at the orthogonal junction therebetween.

Figure 4:
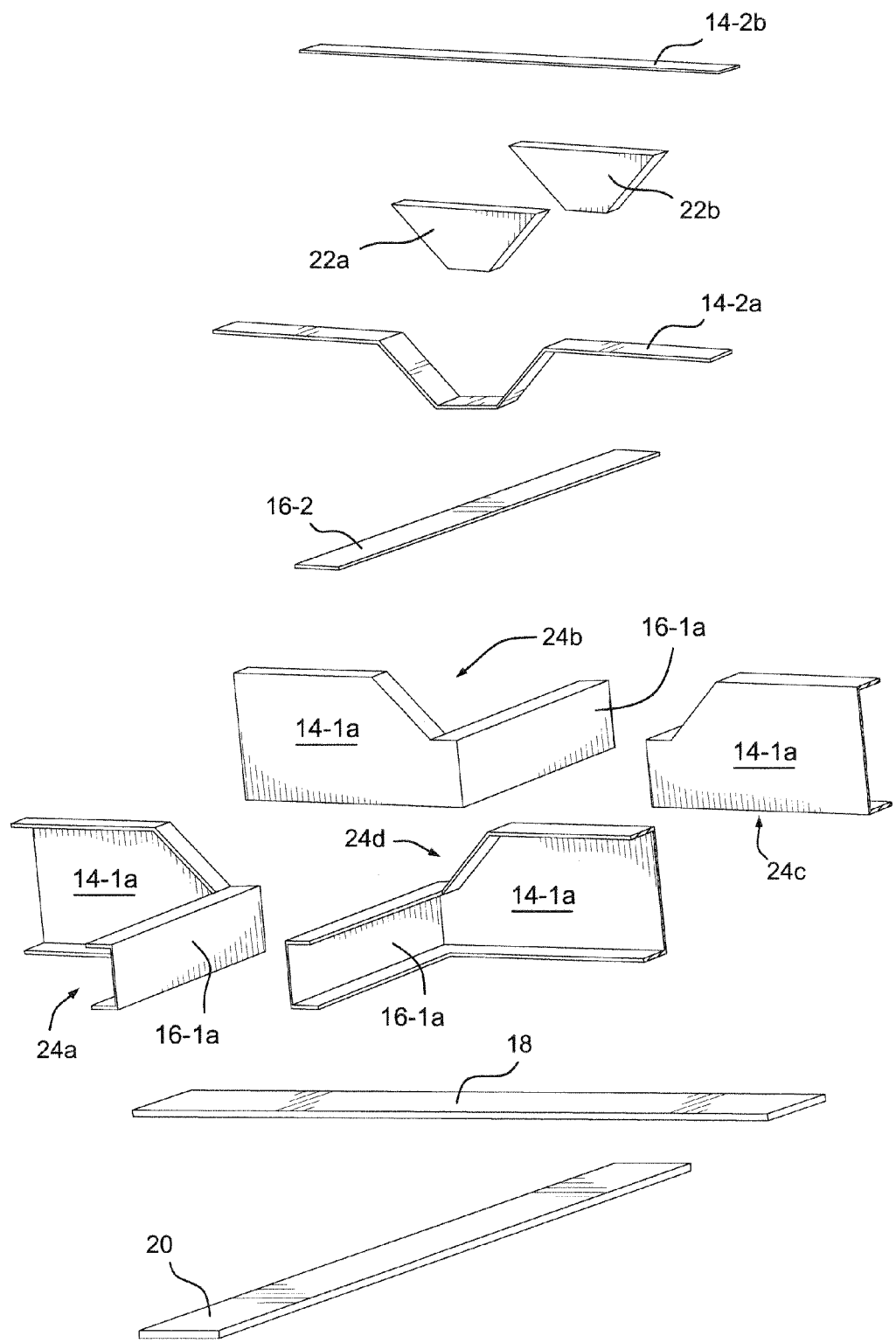
FIG. 4 is a schematic exploded view showing in greater detail one embodiment of the manner in which the junction of the stringer and frame members in the panel of FIG. 1 is constructed.
Figure 5:
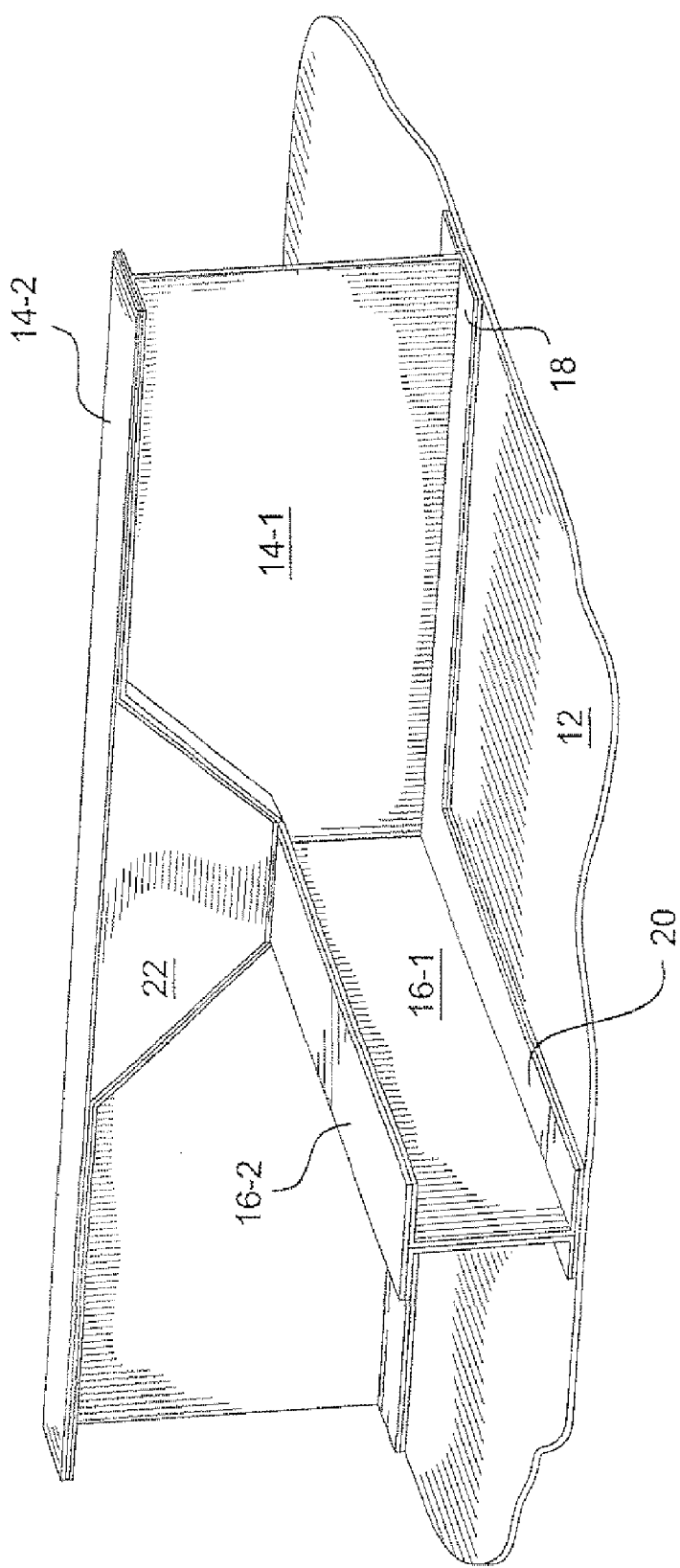
FIG. 5 is a perspective view showing the constructed junction of the stringer and frame members.

As is perhaps better shown in accompanying FIG. 4, the junctions of the frame and stringer members 14, 16 may be fabricated from preformed modular junction elements 24a-24d. In the embodiment depicted, the modular junction elements 24a-24d are substantial mirror images of one another and include respective mutually orthogonal component webs 14-1a and 16-1a. When abutted against one another as depicted in FIG. 4, the abutted component webs 14-1a and 16-1a will form respective parts of the webs 14-1, 16-1 of the frame and stringer members 14 and 16 at the intersection therebetween. Similarly, the bridge elements 22 may be formed from a pair of preformed bridge sections 22a-22b that may be mirror-images relative to one another. The continuous plies forming the reinforcement members 18, 20 and the flange caps 16-2 and 14-2 (the latter being represented by bridge sections 14-2a and 14-2b so as to join the bridge sections 22a, 22b one to another and to the other components) are cross-laminated with one another and with the modular junction elements 24a-24d, 22a and 22b so as to form, after cure, a monolithic rigid intersection between the frame and stringer members 14, 16, respectively as depicted in accompanying FIG. 5.

The skin 12, the frame members 14 and the stringer members 16 are preferably formed from composite materials, such as carbon fiber reinforced epoxy laminates. The frame members 14 and/or stringer members 16 can be co-cured or co-bonded or bonded to the skin 12. For example, in one embodiment, the frames members 14 and/or stringer members 16 can be joined to the skin 12 during a co-curing process in which the frame members and/or stringer members 16 are co-cured with the skin 12 at an elevated temperature and pressure.

A plurality of stiffener preforms comprising stringer members 16 and frame members 14 (the latter crosswise to the stringer members 16) may be laid across the skin 12 on top of pre-positioned layers or strips of an adhesive or bonding substance (e.g., joining elements) that, upon curing of the panel, fixedly bonds the frame members 14 and stringer members 16 to the panel (i.e., so that the lower flanges of frame members 14 and stringer members 16 are joined to the skins forming the reinforcement members 18, 20, respectively).

Frame members 14 and stringer members 16 of each module attach one to another, at three different regions, namely the outer flanges (reinforcement members 18, 20), the webs 14-1, 16-1, and the inner flanges 14-2. 16-2. In frame members 14 and stringer members 16, flanges (i.e., flanges 14-2, 16-2 and the reinforcement members 18, 20) and webs 14-1, 16-1 are stacks of laminae, i.e. plies of laminated composite material. Some laminae of the inner flanges 14-2 of the frame members 14 are placed one on top of the other in an alternate way in order to match the inner flanges 16-2 of the stringer members 16, forming an overlapped local joint. The outer flanges (reinforcement members 18, 20) of both frame members 14 and stringer members 16 are laminated with the skins 12 along their entire lengthwise extent. The webs 14-1 of the frame members 14 and/or the webs 16-1 of the stringer members 16 are interrupted and spliced at the crossing points, with or without additional plies.

Longitudinal and transversal plies are continuous, generating an overlapped area in each intersection. Type, direction and number of plies are laid-out according to engineering requirements. At every intersection, the web of one element can be folded to match the web of the orthogonal element, in a splicing region. Therefore, according to preferred embodiments of the present invention, the frames 14 do not need to have openings at the locations so as to allow the stringer members 16 to pass therethrough as is the case with conventional constructions.

Figure 6:
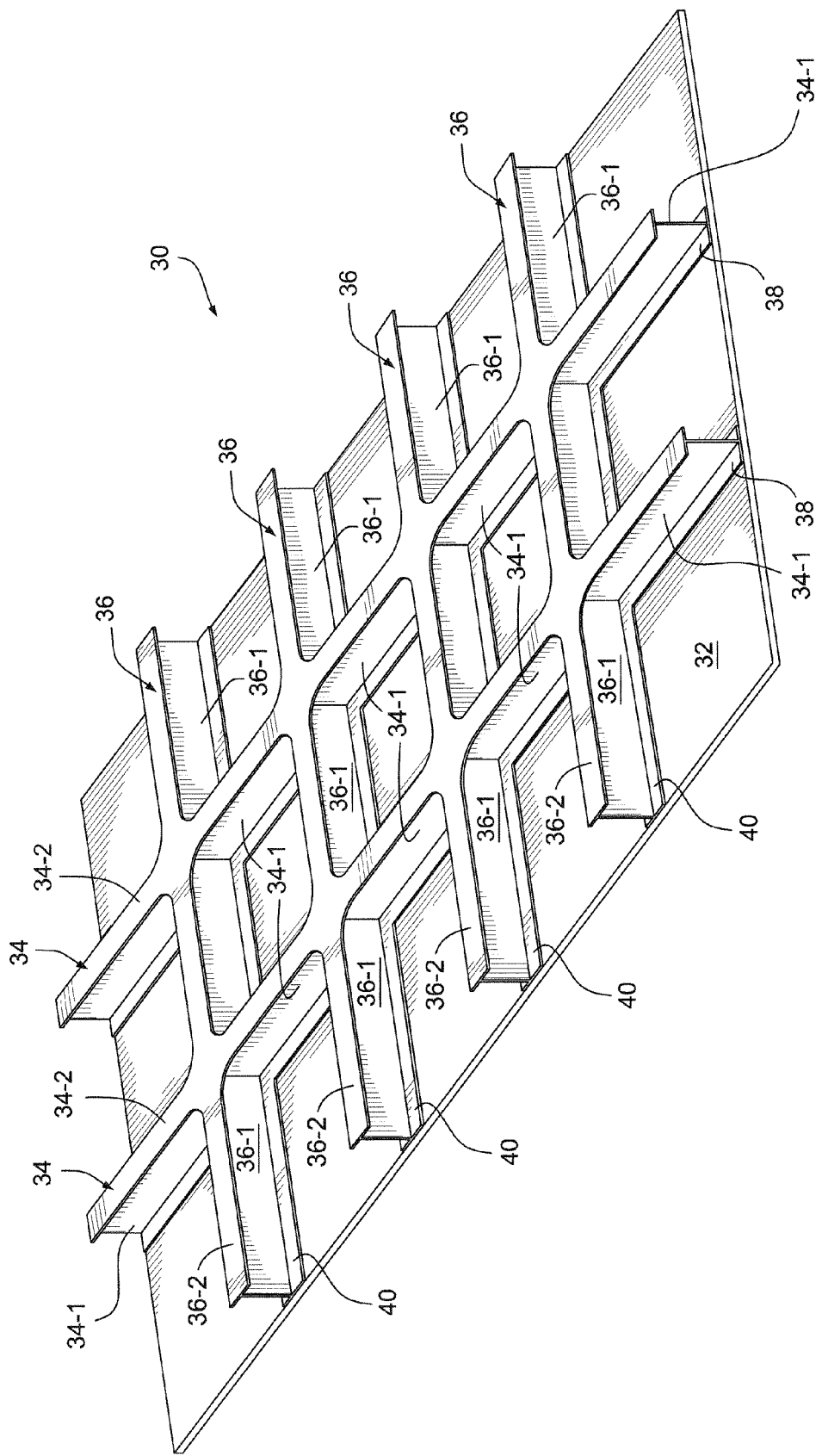
FIG. 6 is a perspective view of another embodiment of a monolithic structural panel in accordance with the present invention.
Figure 7:
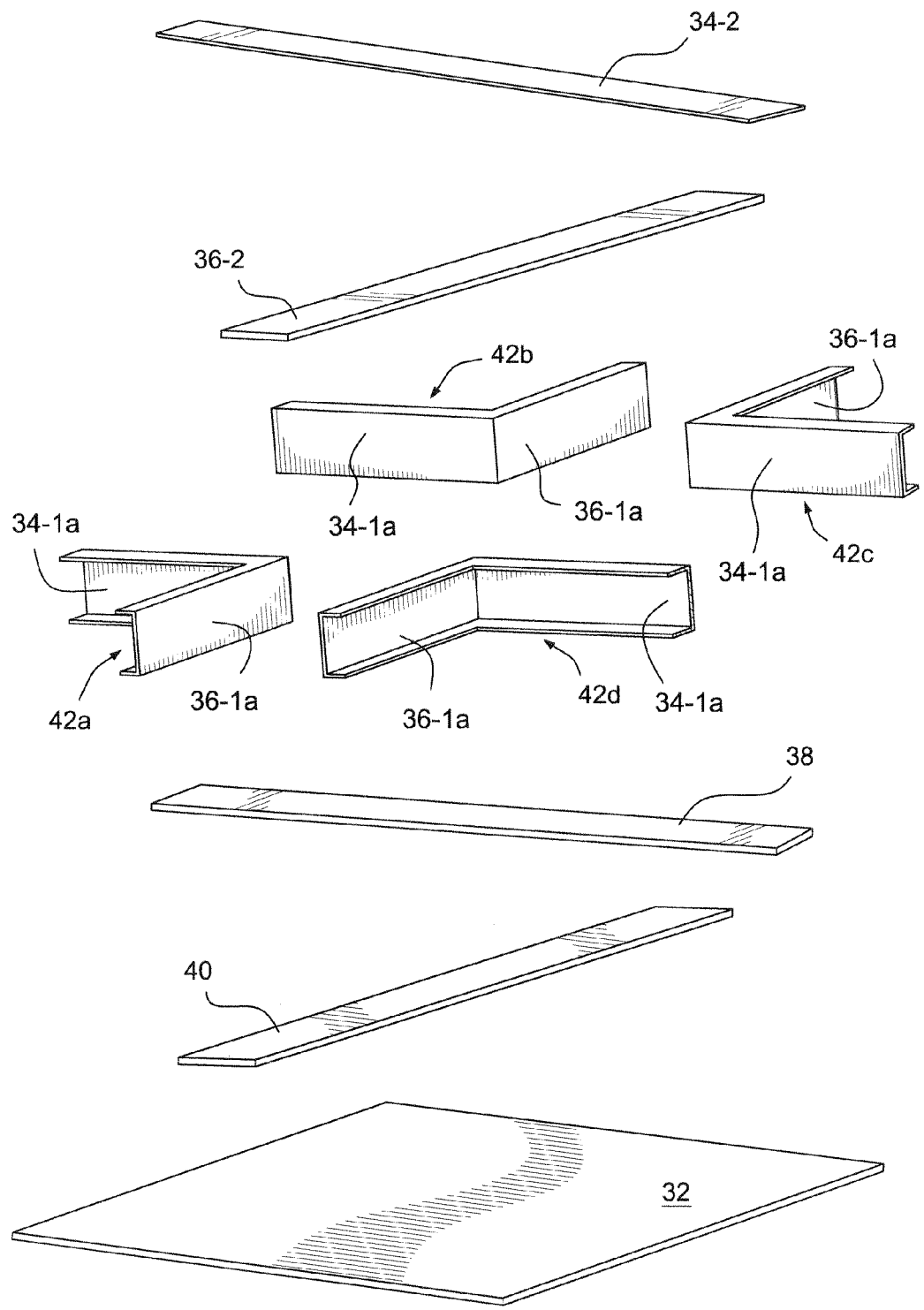
FIG. 7 is a schematic exploded view showing in greater detail an embodiment of the manner in which the junction of the stringer and frame members in the panel of FIG. 6 is constructed.

An alternative embodiment of a monolithic structural panel 30 is depicted in accompanying FIGS. 6 and 7. In this regard, similar to the panel 10 described above, the panel 30 shown in FIG. 6 is comprised of a skin 32 and mutually orthogonal frame and stringer members 34, 36, respectively. Reinforcement members 38, 40 form a reinforcement base adjacent the skin 32 for each of the frame and stringer members 34, 36, respectively. The frame and stringer members 34, 36 will have a web 34-1, 36-1 joining the reinforcement members 38, 40 and the upper flange caps 34-2, 36-2. These upper flange caps 34-2, 36-2 will be formed of cross-laminated plies of composite material so that when cured a monolithic upper flange is created. After curing, the junctions between the monolithic upper flange caps 34-2, 36-2 may be beveled somewhat by a suitable grinding tool so as to provide stress relief at the junction.

Thus, as was the case with panel 10 described previously, the junctions of the frame and stringer members 34, 36 may be fabricated from preformed mirror image pairs of modular junction elements 42a-42d. As is shown in accompanying FIG. 7, the pairs of modular junction elements 42a-42d include respective mutually orthogonal component webs 34-1a, 36-1a. Therefore, when the modular junction elements 42a-42d are abutted against one another as depicted in FIG. 7, the abutted component webs 34-1a and 36-1a will form respective parts of the frame and stringer members 34 and 36 at the junctions therebetween. The continuous plies forming the reinforcement members 38, 40 and the flange caps 36-2 and 34-2 are cross-laminated with one another and with the abutted pairs of modular junction elements 42a-42d so as to form, after cure, a monolithic rigid junction between the frame and stringer members 34, 36.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A monolithic structural panel comprising:
   a skin, and
   mutually orthogonal frame and stinger members attached to the skin and forming a plurality of junctions therebetween, wherein
   each of the frame members, stringer members and skin is formed of a fiber-reinforced composite material, and wherein
   the junctions between the mutually orthogonal frame and stringer members include cross-plied laminae of fiber-reinforced composite material and opposed mirror image pairs of preformed modular junction elements, wherein the preformed modular junction elements include mutually orthogonal component webs, each mutually orthogonal component web of one preformed modular junction element being abutted against a respective mutually orthogonal component web of another preformed modular junction element to thereby form mutually orthogonal component frame and stringer webs establishing respective parts of the frame and stringer members.

2. A panel as in claim 1, wherein the modular junction elements are structurally united to one another by lengthwise flanges formed of laminae of fiber-reinforced composite material.

3. A panel as in claim 2, wherein the frame members include bridge elements at the junctions between the frame and stringer members, and wherein the bridge elements are joined to the stringer members by means of the lengthwise flanges.

4. A panel as in claim 3, wherein the bridge elements are generally V-shaped.

5. A one-piece structural panel for aircraft comprising:
   frame members and stringer members formed entirely from a fiber-reinforced composite material and intersecting with one another at respective monolithic junctions, wherein
   the monolithic junctions of the frame and stringer members include opposed mirror image pairs of abutted preformed modular junction elements each of which includes mutually orthogonal component webs, wherein each mutually orthogonal component web of one of the preformed modular junction elements is abutted against a respective mutually orthogonal component web of another preformed modular junction element to thereby form mutually orthogonal component frame and stringer webs which establish a respective part of the frame and stringer members of the monolithic junctions with other ones of the abutted preformed junction elements.

6. A panel as in claim 5, further comprising a skin formed from a fiber-reinforced composite material joined to the frame and stringer members.

7. A panel as in claim 5, wherein the abutted preformed modular junction elements are structurally united to one another by lengthwise flanges formed of laminae of fiber-reinforced composite material.

8. A panel as in claim 7, wherein the frame members include bridge elements at the intersections between the frame and stringer members, and wherein the bridge elements are joined to the stringer members by means of the lengthwise flanges.

9. A panel as in claim 8, wherein the bridge elements are generally V-shaped.

10. A panel as in claim 3 or 8, wherein the bridge elements include a pair of preformed abutted bridge sections.

11. A panel as in claim 10, wherein each of the performed abutted bridge sections is generally V-shaped.

* * * * *